United States Patent Office 3,197,310
Patented July 27, 1965

3,197,310
FIBROUS GLUTEN PRODUCT AND PROCESS FOR PREPARING SAID PRODUCT
Niles A. Kjelson, Minneapolis, Minn., assignor to General Mills, Inc., a corporation of Delaware
No Drawing. Filed Apr. 30, 1962, Ser. No. 191,339
12 Claims. (Cl. 99—17)

The present invention relates to a fibrous gluten product and to the process of preparing said product. More particularly, it relates to a simulated high protein meat product prepared from gluten and defatted oil seed flours.

It is known that wheat gluten sets-up to a medium firm body by oven heating. It is also known that vegetable chops can be prepared from wheat gluten by mixing the gluten with flavoring agents and fats and then oven-setting the resulting mixture. Such chops have a certain amount of chewiness, but they do not duplicate the fibrous character of meat and are too uniform to the bite. The finished products might be classed almost as soft gels. Prolonged heating and/or higher temperatures add little to increase the firmness, particularly for products to which relatively large amounts of fat have been added for better eating qualities.

The bite or chewiness of simulated meat products prepared from gluten can be improved significantly by the addition of a heat coagulable protein to the gluten prior to oven-setting and/or by the inclusion therein of hardened gluten strips prepared by cooking a gluten composition under steam pressure. These food products have good chewiness and good variations in bite and when dyed, simulate natural meats to a high degree. However, no distinct fibers or fibrous texture is evident in the final products. It would be highly desirable to prepare a product which also has the fibrous structure.

Fibrous synthetic meat products have been prepared from edible proteins (such as soy protein) by forming a spinning dope from said protein, extruding the dope through a porous membrane into an acid-salt precipitating bath to form filaments or fibers, stretching said filaments to orient the molecules thereof, neutralizing the filaments to a pH of about 4.0 to 7.0 and then binding said filaments by suitable means to form the fibrous meat products. As is obvious from the brief description, a large number of relatively complicated steps are required to produce the simulated meat products using the spun fiber process. Additionally, relatively pure proteins must be used to form the spinning dope. Thus, defatted oil seed flours or meals could not be spun without upgrading the same with more protein such as casein.

I have now discovered that simulated meat products having improved eating qualities and a fibrous texture can be prepared by simple inexpensive processing from gluten by including therein a defatted oil seed flour or meal, intimately blending said mixture and then allowing the whole compostion to set-up by heat.

It is an object of the present invention to provide a novel fibrous meat product.

Another object is to provide such a product from gluten and defatted oil seed flours or meals.

An additional object of the invention is to provide a process for preparing such simulated meat products.

These and other objects will become apparent from the following detailed description.

The gluten used to prepare the food products of my invention is preferably freshly prepared wheat gluten. However, dried gluten which is then reconstituted with about 50 to 75%, and preferably about 60 to 70%, by weight water can also be used.

The defatted oil seed flour or meal is derived from oil seeds such as soy beans, peanuts, castor beans, safflower seeds, and the like. Said flour is preferably prepared from soy beans. The beans are first broken down to form flakes (hulls and the like are removed). The oil is then extracted from the flakes by any suitable means such as with a petroleum solvent and/or an alcohol. A particularly suitable petroleum solvent is hexane. Representative alcohols are ethanol and isopropanol. Aqueous solutions of said alcohols may also be used with the azeotropic solutions being preferred. The solvents are mixed with the oil seed flakes and agitated for a sufficient length of time to remove substantially all of the oil therefrom. It is also possible to first extract the flakes with hexane, for example, followed by extraction thereof with the alcohol. The alcohols have a tendency to remove most or all of the bitter ingredients of the oil seed flakes. After extraction, the petroleum solvent and/or alcohol is removed by vapor desolventizing. Thus, hexane-wet flakes, for example, can be subjected to a continuous stream of super-heated hexane vapors in a closed system. It is understood that other desolventizing means can be used such as vacuum warm air drying, and the like. In fact, any of the known methods of extracting oil from the oil seed flakes can be used. The substantially solvent-and oil-free flakes are then preferably toasted by heating at elevated temperatures of about 100–150° C. for a few minutes to an hour or more. Additionally the flakes are preferably reduced in size to a fairly uniform flour having particles which will be retained on about a 100 to 300 mesh screen. The defatted oil seed flour can be used in amounts of about 5 to 35% by weight, based on the weight of the wet gluten (i.e., gluten containing about 50 to 75% by weight water).

The compositions also preferably contain a heat coagulable protein such as egg albumen or dried egg whites. The amount thereof can be in the range of about 5 to 40% by weight based on the weight of the wet gluten.

Various other additives can be included in the food products of my invention. Thus, flavoring agents, colorants, oils, and fats can be added, preferably after the gluten and defatted oil seed flour have been intimately blended to form the fibrous structure. Examples of flavoring agents are synthetic and natural flavors such as those derived from bouillon cubes having chicken, beef and other flavors, beef extract, liquid smoke, various salts and spices, onions, garlic, and the like. A wide variety of vegetable oils and animal fats and oils may also be included in the food products. Representative thereof are soybean oil, cottonseed oil, safflower oil, peanut oil, sesame seed oil, corn oil, butter, chicken fat, lard, tallow, cod-liver oil, and the like. Said fats and oils may be partially or fully hydrogenated.

Dyes and pigments or other colorants can also be added to the gluten compositions. In this way, the color of naturally occurring meats can be simulated.

As previously indicated, the desired amount of defatted oil seed flour is added to the gluten and then the mixture is intimately blended until a fibrous body results. Such blending may be accomplished in a Waring Blendor in about 5–15 minutes, for example. Of course, other blenders and mixers can be used with the blending or mixing being continued until fiber formation is achieved. It is also preferable to add a heat coagulable protein to the gluten and defatted oil seed flour prior to the fiber formation.

After the above-described fiber forming step, the composition is set-up by oven heating. The temperatures and times of the oven heating are not critical, but will generally be in the range of about 250° F. to 450° F. and a few minutes to 50 minutes or more, respectively. The flavoring agents, colorants and fats or oils are added preferably after the fiber forming step and prior to the setting-up procedure.

While the invention relates generally to a homogeneous meat product prepared from the above-described ingredients, it also includes products which contain portions or areas having variations in bite or chewiness. Such products may be prepared by first forming fibrous compositions having different gluten, defatted oil seed flour, or heat coagulable protein contents and then mixing or layering said compositions in a suitable pan to provide areas or portions composed of different compositions. The resulting mixture is then oven set.

Additionally, the food products of the present invention may include hardened strips or shreds of gluten containing no heat coagulable protein or defatted oil seed flour. Such strips or shreds are prepared by mixing the gluten containing about 50 to 75% by weight water with the desired coloring agents, flavoring agents, oils or fats, and then subjecting the mixture to cooking under steam. Thus, the mixture can be sealed in tins and autoclaved at about 5 to 25 lbs. steam pressure for a few to fifteen minutes or more. The resulting hardened gluten is removed from the tins and cut into various shaped strips or shreds, which can then be mixed with the fibrous gluten compositions. Also, various freshly prepared or oven-set compositions prepared from the gluten and egg albumen can be mixed with the fibrous gluten compositions. These heterogeneous compositions, when oven-set, have even further variations in bite or chewiness.

It is also possible to use different dyes, fats and flavoring agents in the various gluten compositions—i.e., the fibrous compositions, the hardened gluten strips, or the gluten compositions containing only the egg albumen. In this way, products having variations not only in bite and texture, but in color and flavor can be obtained. The oven-set product can be smoked to even further enhance the flavor thereof. The products can also be dehyrated and used in bake-type hot dishes or blended with natural meats to make hamburger, sausage and the like.

The following examples are given by way of illustration only and are not to be construed as limiting the invention thereto.

*Example I*

A mixture of 100 parts fresh wheat gluten, 10 parts dried egg whites and 20 parts toasted, defatted soy bean flour (200 mesh) was intimately mixed in a Waring Blendor. Distinct fibers were produced after blending for about 10 minutes. The fibrous composition was then oven-set at a temperature of 240° F. for 10 minutes. The fibers were still apparent in the resulting product giving it a meat-like texture and appearance.

*Example II*

A simulated beef product is prepared by forming a fibrous composition from the same ingredients and method of Example I, followed by addition of beef extract, red dye and vegetable oil and oven-setting. The resulting product has a meat-like texture and appearance, and an excellent flavor.

*Examples III–V*

Example I was repeated, except that the toasted, defatted soy bean flour was replaced by a spray dried water soluble portion of defatted soy bean flakes (Example III), a dried and pulverized flour prepared from the water insoluble portion of defatted soy bean flakes (Example IV) and a finely divided soy protein isolate prepared by extracting defatted soy bean flakes with an aqueous alkaline solution and then precipitating the protein therefrom by addition of an acid (Example V). No fibers or fibrous structure were formed in any of these examples.

Examples I and III–V show that it is critical to use the whole defatted oil seed flour in the preparation of the fibrous meat products, rather than various fractions thereof.

It is understood that the invention is not to be limited to the exact details of operation or the exact compositions and processes shown or described, as obvious modifications will be apparent to those skilled in the art and the invention is to be limited only by the scope of the appended claims.

The embodiments of the invention in which an exclusive property or privilege is claimed are defined as follows:

1. The process of preparing a fibrous high protein food product which comprises intimately blending a composition comprising a substantial proportion of wet gluten containing about 50 to 75% by weight water with about 5 to 35% by weight defatted oil seed flour based on the weight of the wet gluten and oven-setting the resulting composition, said intimate blending being sufficient to cause formation of distinct fibers.

2. The process of claim 1 wherein the gluten composition also contains at least one additive selected from the group consisting of flavoring agents, colorants, oils and fats.

3. The process of claim 1 wherein a heat coagulable protein is added to the gluten and defatted oil seed flour prior to the intimate blending thereof.

4. The process of claim 3 wherein at least one additive selected from the group consisting of flavoring agents, colorants, oils and fats is added to the intimately blended gluten, defatted oil seed flour and heat coagulable protein prior to the oven-setting step.

5. The process of claim 3 wherein the heat coagulable protein is egg albumen.

6. The process of claim 3 wherein the defatted oil seed flour is defatted soy bean flour.

7. The process of claim 1 wherein the defatted oil seed flour is defatted soy bean flour.

8. The process of claim 1 wherein the gluten is freshly prepared wheat gluten.

9. The process of claim 1 wherein the composition contains meat flavors.

10. The process of claim 1 wherein the oven-setting is accomplished at temperatures of about 250° to 450° F.

11. The process of claim 1 wherein hardened gluten strips are added to the intimately blended gluten and defatted oil seed flour prior to the oven-setting step.

12. The high protein food product produced by the process of claim 1.

References Cited by the Examiner

UNITED STATES PATENTS

| | | | |
|---|---|---|---|
| 2,802,737 | 8/57 | Anson et al. | 99—14 |
| 2,830,902 | 4/58 | Anson et al. | 99—14 |

FOREIGN PATENTS 158,410  11/51  Australia.

A. LOUIS MONACELL, *Primary Examiner.*

BEATRICE H. STRIZAK, *Examiner.*